United States Patent

[11] 3,634,866

| [72] | Inventor | Howard P. Meyer |
| --- | --- | --- |
| | | Route 1, Box 251, Kingsbury, Tex. 78638 |
| [21] | Appl. No. | 844,340 |
| [22] | Filed | July 24, 1969 |
| [45] | Patented | Jan. 11, 1972 |

[54] VEHICLE AND DRIVER MONITORING SYSTEM
3 Claims, 7 Drawing Figs.

[52] U.S. Cl..................................................... 346/33 R,
340/32, 340/235, 346/59
[51] Int. Cl..................................................... G07c 5/08
[50] Field of Search........................................ 346/33 R,
33 D, 59, 60, 73; 35/11; 340/22, 32, 235; 73/171

[56] References Cited
UNITED STATES PATENTS

| 1,005,035 | 10/1911 | Hoeft............................ | 346/33 |
| --- | --- | --- | --- |
| 2,584,149 | 2/1952 | Moffitt et al.................. | 346/49 |
| 2,633,404 | 3/1953 | Hathaway..................... | 346/134 |
| 3,160,463 | 12/1964 | Moscarini..................... | 346/33 |
| 3,185,992 | 5/1965 | Smith........................... | 340/32 X |
| 3,388,404 | 6/1968 | Bush............................. | 346/61 X |
| 3,446,069 | 5/1969 | Zink............................. | 340/235 X |

*Primary Examiner*—Joseph W. Hartary
*Attorneys*—Harry A. Herbert, Jr. and Henry S. Miller, Jr.

ABSTRACT: A vehicle and driver continuous monitoring system including an inkless strip chart actuated by a vehicle's ignition switch and a number of sensors connected to the various vehicle systems which provide information to the recorder in either continuous or discrete form. The system includes transmitters combined with highway markers operating on distinct frequencies and a vehicle receiver to convert the signals into information on the strip chart as the vehicle passes the highway marker.

PATENTED JAN 11 1972

INVENTOR.
HOWARD P. MEYER
BY

INVENTOR
HOWARD P. MEYER
BY
ATTORNEY
AGENT

INVENTOR.
HOWARD P. MEYER
BY
ATTORNEY
Henry S. Miller
AGENT

VEHICLE AND DRIVER MONITORING SYSTEM

BACKGROUND OF THE INVENTION

This invention relates generally to a vehicle and driver monitoring system and more particularly to a means for testing a driver's proficiency by recording the condition of various vehicle systems under the driver's control.

Heretofore, the only practical method available for testing a vehicle operator's proficiency was to use an evaluator. The evaluator would sit next to the driver and instruct the driver to perform certain operations on which the evaluator was qualified to pass judgment. This method may be satisfactory for short term proficiency testing or "spot" checking however, it is impractical to use this method on a long term basis.

Some machines have been produced which are used in the classrooms and aid in the instruction of drivers; these devices fail, however, to provide realistic evaluation of proficiency in that road conditions vary so greatly from actual classroom conditions, it is never known for certain how a driver may react under a given set of circumstances when he is unaccompanied.

Evaluation procedures are very important where large fleets of vehicles are involved. In these situations, many drivers—perhaps hundreds of drivers—need to be evaluated. As a driver's age increases or his health deteriorates, his proficiency drops and while it may be relatively simple to detect this where a small number of drivers is involved, it is practically impossible where a large fleet owner has drivers throughout the country. Because of the great deal of damage that can be caused by one careless driver, particularly where large motor vehicles are concerned, it is of the utmost importance that the fleet owners have expert drivers to operate their vehicles.

There is also importance in knowing the proficiency of a vehicle driven in cases where a driver is involved in an accident. SUch things as vehicle speed, highway conditions, whether or not the driver was using his lights, whether or not the driver used his seat belt, when the driver applied his brakes, and related matters are often in dispute. Presently there is practically no means of verifying these things other than by the testimony of the involved operator.

With the instant invention, it is now possible to continuously record the various operations performed by the driver thereby providing a record of his proficiency and likewise his utilization of the various vehicle systems. The instant invention will provide a complete record of the selected functions from the time the motor is started until it is turned off. In addition, the invention records the time and the date of each event thereby making it extremely practical to test the operator's efficiency on a continuing basis.

SUMMARY OF THE INVENTION

The invention is characterized by a strip chart recorder utilizing a pressure-sensitive recording tape. The recorder includes a number of styli which are connected through appropriate system sensing devices located throughout the vehicle. Upon turning the vehicle's ignition switch, the vehicles's time-date stamp would be activated indicating the beginning of operation for a particular period.

In addition to the number of styli, there are a plurality of electrically actuated metal stamps. The styli are utilized where a continuous record is required to be kept, as for example, a record of speed or engine r.p.m. The metal stamps are used where a completed operation is necessary to be recorded; for example, when the driver's seat belt is fastened, a circuit will be completed thereby causing an indicative stamp to strike the recording tape leaving an imprint and a permanent record. The recording tape is removable, subject to analysis and grading thereby providing an accurate indication of the driver's proficiency.

The monitoring system is readily adaptable to be incorporated into a larger system whereby visual traffic control markers would be equipped with low-power highly directional RF transmitters. Each marker would have a particular frequency indicative of the legend thereon. A small receiver in the vehicle picks up the transmission as it approaches the marker, converts the signal into an electrical impulse which in turn activates the appropriate metal stamp causing a permanent record to be made.

It is, therefore, an object of this invention to provide a new and improved vehicle and driver monitoring system.

It is another object of this invention to provide a new and improved system for driver testing.

It is a further object of this invention to provide a system for permanently recording actions and reactions of vehicle operators.

It is still another object of this invention to provide a new and improved system for producing a permanent record of the actions taken by a vehicle driver.

It is still a further object of this invention to provide an apparatus for continuously monitoring driver utilization of vehicle systems.

It is another object of this invention to provide a system that will provide a permanent authoritative record of road surface conditions and speed limit for a motor vehicle.

These and other advantages, features and objects of the invention will become more apparent from the following description taken in connection with the illustrative embodiments in the accompanying drawings.

DESCRIPTION OF THE PREFERRED EMBODIMENTS

Figure 1:
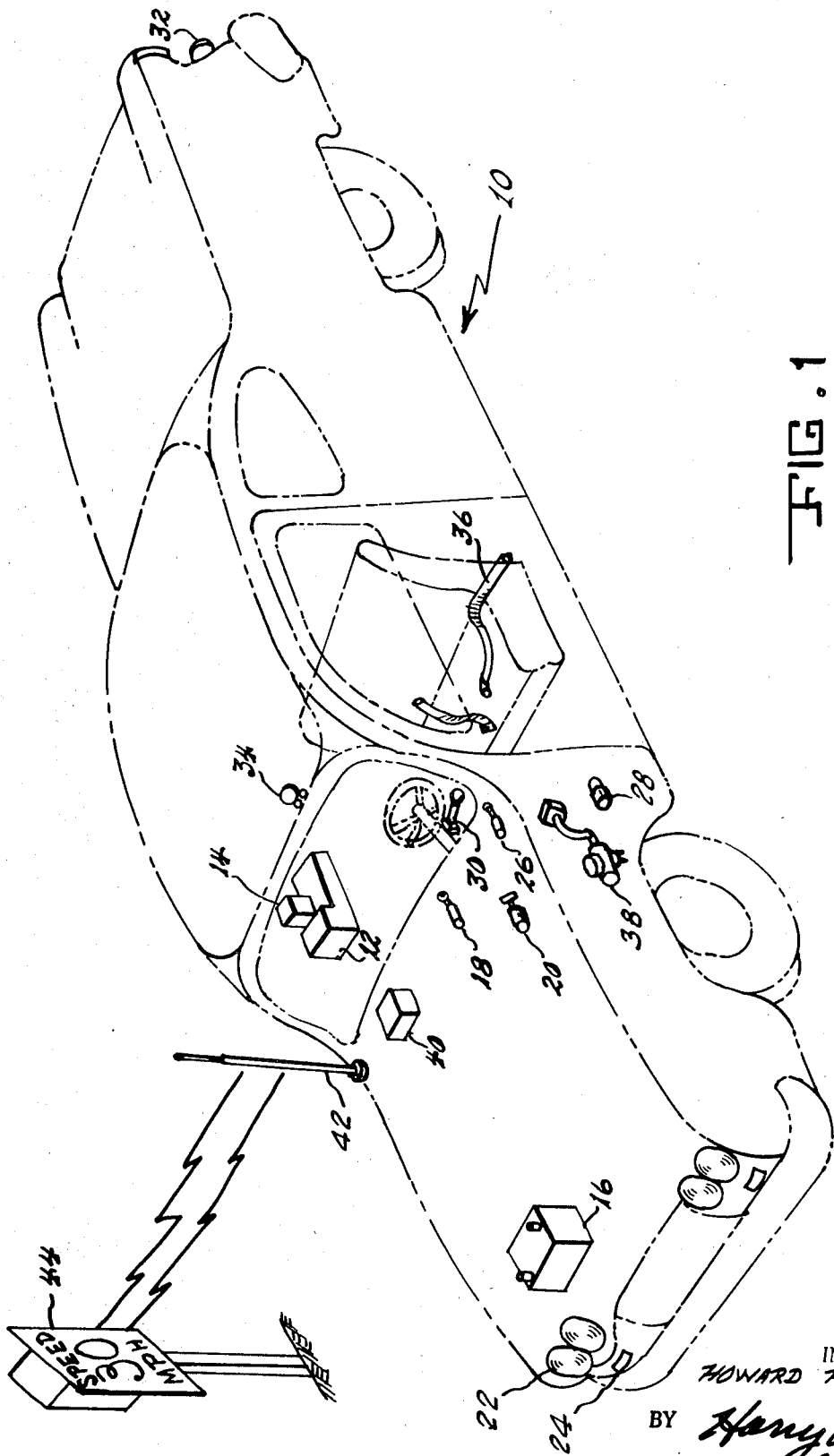
FIG. 1 is a schematic representation showing the various components which may be linked together to form the system of this invention.

Referring now to FIG. 1, there is shown generally an automobile 10 with a plurality of systems which may be incorporated into the instant invention. A chart recorder 12 equipped with a time clock 14 would be powered by the car's 12-volt battery 16. The recorder is connected to the ignition switch 18, the primary control of the system. A tachometer-generator 20 is connected to the speedometer drive gear to provide an indication of the vehicle's speed. The headlight and parking lights 22 and 24, respectively, are connected to the recorder through the headlight switch 26. The dimming switch 28 may be included in the headlight circuit to show whether high beams or low beams are being utilized. The directional signal light switch 30 is connected to the recorder providing information on the use of the turn signals. Backup lights 32 provide an indication of when the vehicle is in reverse gear. A moisture-sensing switch 34 which may be located on the roof of the car, as shown, or alternatively in any location such as under the fender where accurate information may be obtained regarding the condition of the highway surface. The switch normally open closes upon being exposed to moisture. In the event the highways are damp or wet, the switch will close thereby indicating to the chart recorder the highway condition. The moisture-sensing switch would print automatically when the key is turned on and the circuit is closed or whenever the circuit closed requiring no operation on the part of the driver. Seat belts 36 have an electrical conducting means in them whereby when the two belts are connected an electrical circuit is formed causing a stamp impression to be made on the recording tape. Similarly, the stop light switch 38 is connected to the recorder to provide information with regard to the driver's use of the brake.

In the more comprehensive system, there is provided a radio receiver and relay 40 which is connected to the auto antenna 42 and detects signals from the speed limit sign 44. Each traffic signal—whether it be a speed sign, yield sign, stop sign or whatever—would have its own particular key frequency and would transmit a very directional signal which would be picked up by the antenna and converted into an electrical pulse in the proper key circuit and imprint on the chart the information which the signal or sign visually communicates. This part of the system would, of course, require cooperation from the authorities in order that the signs and signals can be so equipped.

Figure 2:
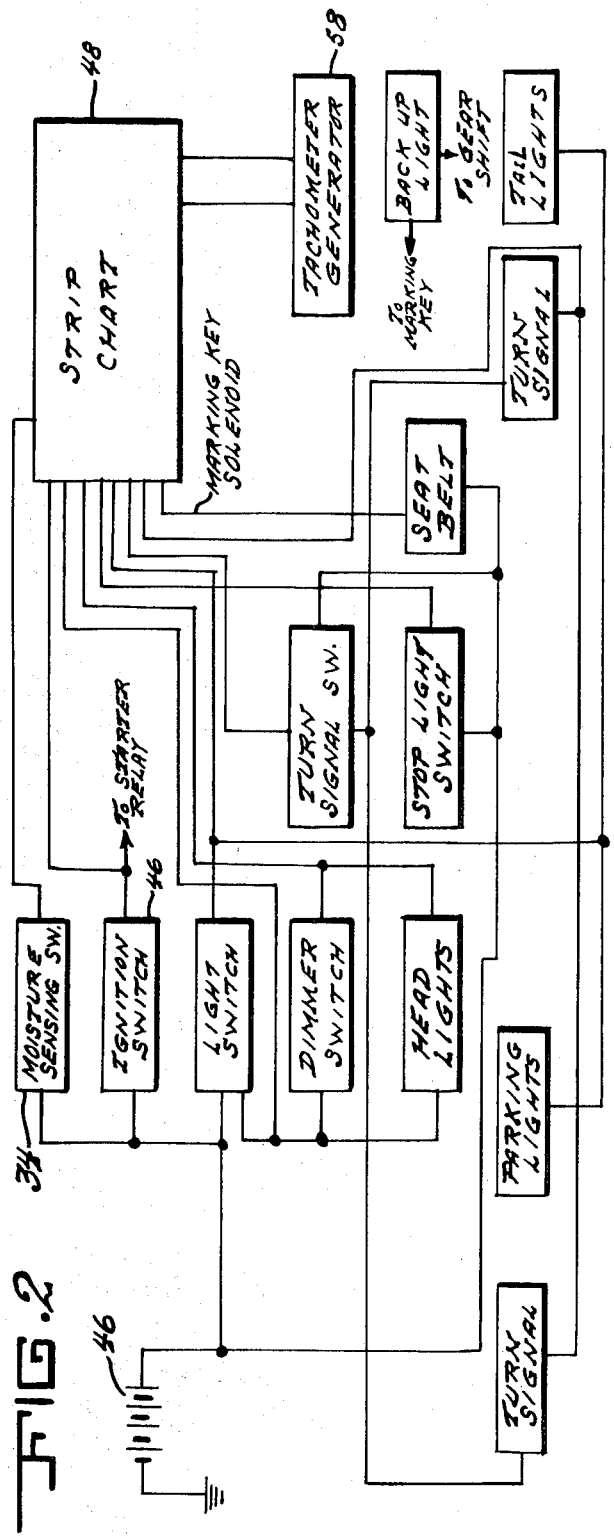
FIG. 2 is a block diagram of the electrical system of the invention.
Figure 3:
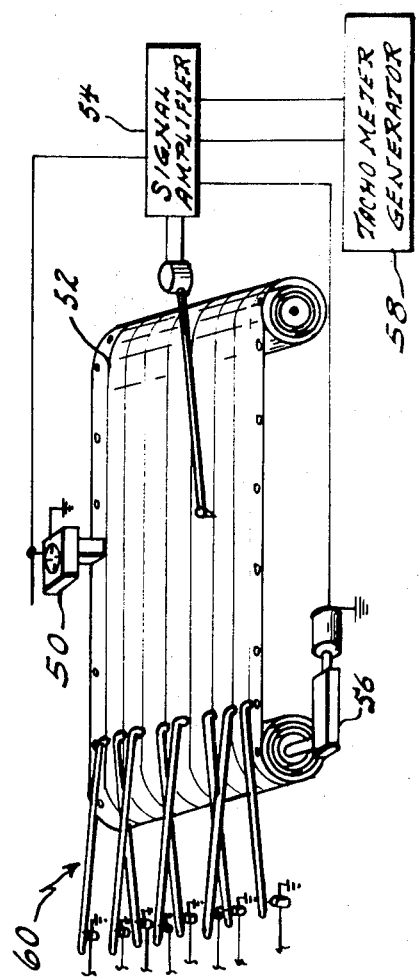
FIG. 3 is a diagrammatical representation of the chart recorder used in the invention.

Concerning FIGS. 2 and 3, there is shown a general circuit configuration showing a limited number of sensing units in the system. This system could, of course, include a great many more, being limited only by the number of marking members in the strip chart.

The system is powered by the auto battery 46 which powers all the normal systems in the automobile in a conventional manner. The ignition switch 46, in addition to its normal function, activates the strip chart 48. In activating strip chart the ignition switch causes the time-date stamp 50, shown in FIG. 3, to stamp the chart 62. In addition, the signal amplifier for the speed stylus 54 is activated and the support motor 56 for the recording chart begins to turn.

After the motor is started and the driver begins to move the tachometer-generator 58 sends a signal to the signal amplifier of the speed stylus and causes it to move across the recording chart.

The chart is pressure sensitive thereby requiring no ink mechanism. Hence only a metal scribe is required on the stylus. Likewise, metal stamps of appropriate symbols are all that are needed for the marking keys. As the driver activates the various systems, either as he drives or before he leaves, metal keys shown generally at 60, stamp the recording chart. Because of the need for the stylus to be able to swing from edge to edge on the recording chart, it is necessary that the information recorded by the marking keys lead the stylus scribe by a predetermined amount. This amount is taken into consideration when the chart is analyzed.

Figure 4:
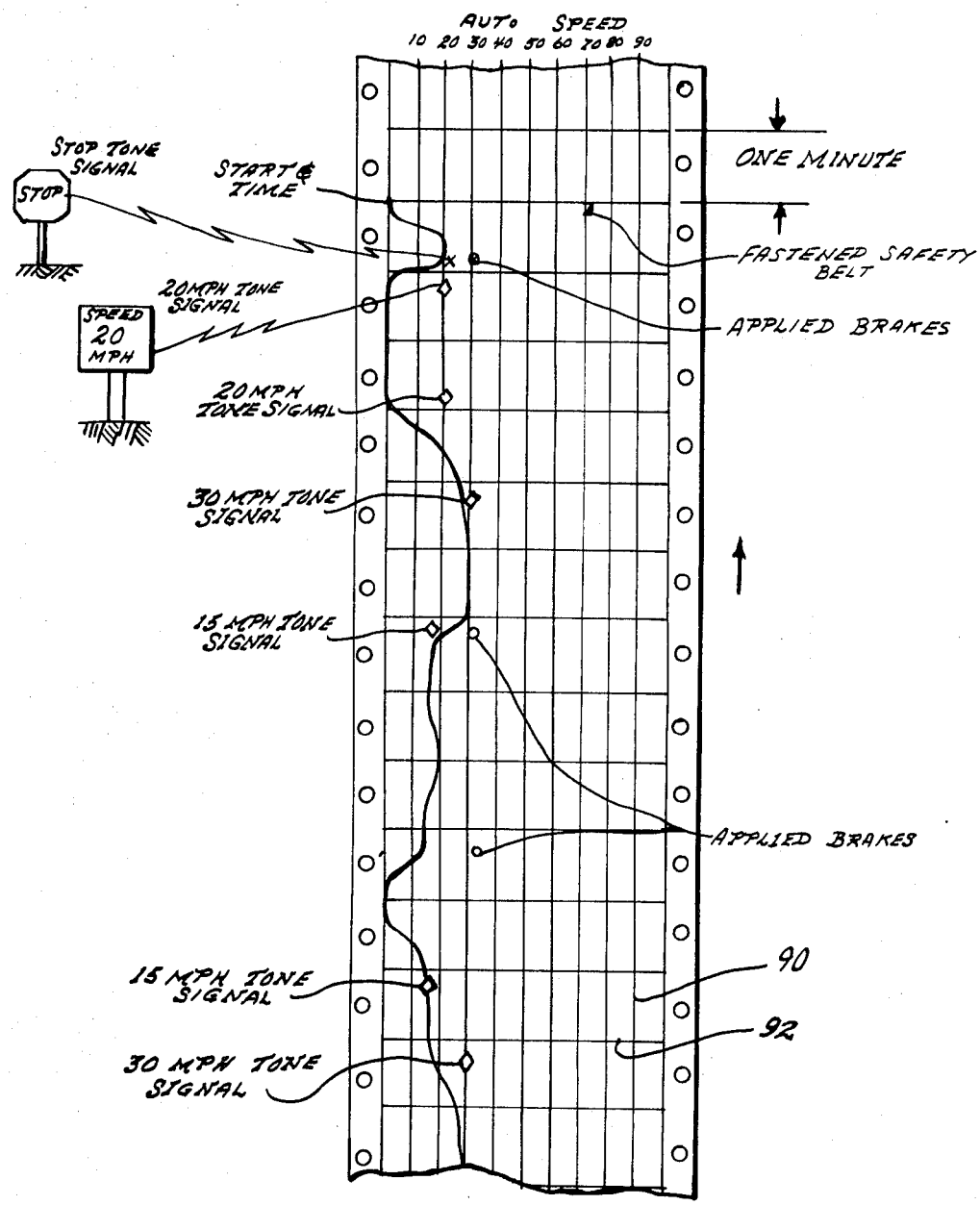
FIG. 4 is an illustrative graphic representative of a strip chart used in the invention.

The chart shown in FIG. 4 is preprinted with 50 longitudinal lines where every sixth line 90 is heavier, thus indicating a 10-mile-per-hour increment. Heavy traverse lines 92 separated by a 1-inch space along the length of the tape indicate 1 minute of time and are subdivided by thinner lines to indicate intervals of 15 seconds. Tapes having other markings may be used where desirable.

Figure 5:
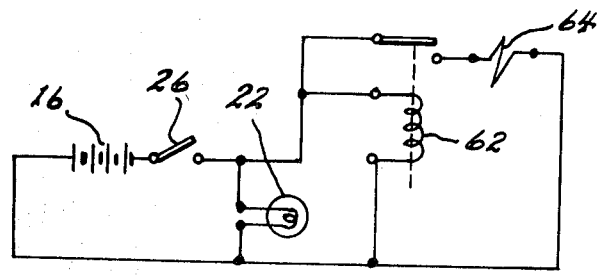
FIG. 5 is a circuit diagram of a typical key circuit of the recorder used in the invention.

As regards FIG. 5, there is shown a typical circuit for the chart key. The auto battery 16 activates the headlight 22 in a conventional manner when the headlight switch 26 is closed. A momentary relay 62 is activated causing the key 64 to strike the recording paper. This system is substantially unchanged for all of the symbolic keys.

Figure 6B:
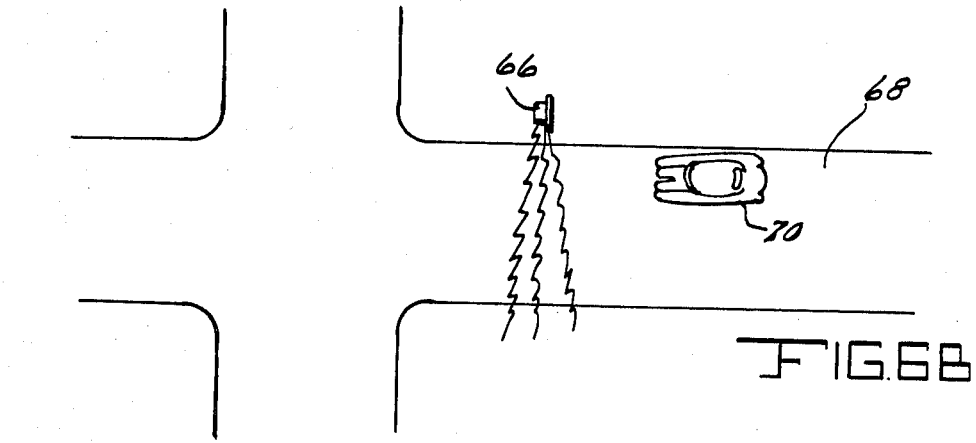
FIGS. 6A and 6B are a representation of one use of the invention.
Figure 6A:
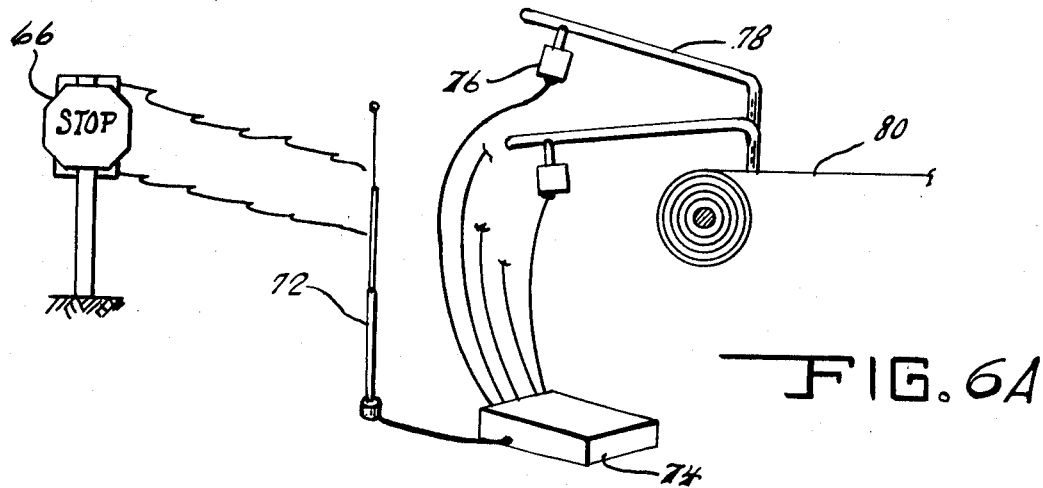

FIGS. 6A and 6B provide a more detailed description of the comprehensive highway system. A stop sign 66 for purposes of illustration transmits a very directional signal across the highway 68 at a predesignated frequency. An automobile 70 passing the sign will pick up the transmitted frequency on its antenna 72. The signal will be sent to a receiver 74 where it will be converted into a pulse of electrical energy and sent to the appropriate relay 76 which in turn will cause the key 78 to strike the recording chart 80.

Having thus described my vehicle and driver monitoring system, I claim as my invention the following:

1. A system for continuously monitoring vehicle operation comprising: a strip chart recorder mounted in a vehicle, including a pressure-sensitive chart, means for driving the chart, a plurality of symbolic stamps, a continuously recording stylus and a time-date stamp, said recorder being started by a vehicle's primary electrical control switch; a plurality of sensing means connected to the symbolic stamps and stylus for monitoring and recording each system's condition within the vehicle; a plurality of radiofrequency transmitters mounted on highway traffic markers, and transmitting a radio signal distinctive of the traffic marker; a radiofrequency receiver mounted in the vehicle and connected to the symbolic stamp whereby upon receiving the transmitted signal, the appropriate symbolic key will make a permanent record on the strip chart.

2. A system according to claim 1 wherein the system sensing means includes a moisture-sensing switch positioned so as to receive moisture for providing an indication of road conditions.

3. A system for continuously monitoring vehicle operator proficiency comprising: a strip chart recording means including a plurality of electrically actuated symbolic metal stamps for leaving impressions on the chart, at least one electrically actuated stylus held in contact with the chart for providing a continuous record of vehicle speed, and a time-date stamp connected to the vehicle power source which is recorded each time the recorder is activated; a plurality of system sensing means attached to the vehicle, including a moisture-sensing switch positioned so as to receive moisture, and electrical means for connecting each sensing means to its recording means.

* * * * *